US008918554B2

(12) United States Patent
Lai et al.

(10) Patent No.: US 8,918,554 B2
(45) Date of Patent: *Dec. 23, 2014

(54) METHOD AND APPARATUS FOR EFFECTIVELY INCREASING A COMMAND QUEUE LENGTH FOR ACCESSING STORAGE

(71) Applicant: Marvell World Trade Ltd., St. Michael (BB)

(72) Inventors: Dishi Lai, San Jose, CA (US); Xinhai Kang, Milpitas, CA (US); Kanting Tsai, San Jose, CA (US); Qun Zhao, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 37 days.

This patent is subject to a terminal disclaimer.

(21) Appl. No.: 13/645,370

(22) Filed: Oct. 4, 2012

(65) Prior Publication Data

US 2013/0091307 A1 Apr. 11, 2013

Related U.S. Application Data

(60) Provisional application No. 61/543,929, filed on Oct. 6, 2011, provisional application No. 61/618,238, filed on Mar. 30, 2012.

(51) Int. Cl.
*G06F 3/00* (2006.01)
*G06F 13/00* (2006.01)
*G06F 3/06* (2006.01)

(52) U.S. Cl.
CPC .............. *G06F 3/0679* (2013.01); *G06F 3/061* (2013.01); *G06F 3/0659* (2013.01)
USPC ................................... 710/33; 710/5; 710/34

(58) Field of Classification Search
CPC ...... G06F 3/0659; G06F 3/061; G06F 3/0679; G06F 12/0246; G06F 13/1642; G06F 3/0688
See application file for complete search history.

(56) References Cited

U.S. PATENT DOCUMENTS

| | | | | |
|---|---|---|---|---|
| 4,423,480 | A * | 12/1983 | Bauer et al. | 710/100 |
| 2005/0256983 | A1 * | 11/2005 | Ma | 710/62 |
| 2008/0270678 | A1 * | 10/2008 | Cornwell et al. | 711/103 |
| 2009/0172264 | A1 | 7/2009 | Chung | |
| 2010/0161936 | A1 * | 6/2010 | Royer et al. | 711/209 |

OTHER PUBLICATIONS

Huffman et al., Serial ATA Native Command Queuing, An Exciting New Performance Feature for Serial ATA, Jul. 2003, 12 pages.
Van Rijssel, Debbie, Authorized Officer, European Patent Office, International Search Report and Written Opinion, PCT/IB2012/055386, Mar. 11, 2013, 13 pages.

* cited by examiner

*Primary Examiner* — Idriss N Alrobaye
*Assistant Examiner* — Ronald Modo (57) ABSTRACT

The present disclosure includes systems and techniques relating to effectively increasing a command queue length for accessing storage, such as by increasing the Queuing Depth (Q-Depth) of Native Command Queuing (NCQ) Commands. In some implementations, a method can comprise receiving a first command to access a first memory location of a storage device; receiving a second command to access a second memory location of a storage device; constructing a consolidated command including a memory address and a data transfer count associated with each of the first command and the second command; constructing an information command having consolidation information about the consolidated command; and communicating the information command and the consolidated command to the storage device for processing by the storage device.

23 Claims, 6 Drawing Sheets

Structure for an Information Command (e.g., specified by TAG 0)

| Byte range | Description |
|---|---|
| 0 ~ 63 byte | Summary of consolidation data for TAG 1-7 commands. |
| 64 ~ 127 byte | Detail consolidation data for TAG 1 consolidated command |
| 128 ~ 191 byte | Detail consolidation data for TAG 2 consolidated command |
| 192 ~ 255 byte | Detail consolidation data for TAG 3 consolidated command |
| 256 ~ 319 byte | Detail consolidation data for TAG 4 consolidated command |
| 320 ~ 383 byte | Detail consolidation data for TAG 5 consolidated command |
| 384 ~ 447 byte | Detail consolidation data for TAG 6 consolidated command |
| 448 ~ 511 byte | Detail consolidation data for TAG 7 consolidated command |

Structure for a Consolidated Command (e.g., specified by TAG 1)

| Byte range | Description |
|---|---|
| 0 ~ 7 byte | Command 1 - Data Transfer Count and LBA |
| 8 ~ 15 byte | Command 2 - Data Transfer Count and LBA |
| 16 ~ 23 byte | Command 3 - Data Transfer Count and LBA |
| 24 ~ 31 byte | Command 4 - Data Transfer Count and LBA |
| 32 ~ 39 byte | Command 5 - Data Transfer Count and LBA |
| 40 ~ 47 byte | Command 6 - Data Transfer Count and LBA |
| 48 ~ 55 byte | Command 7 - Data Transfer Count and LBA |
| 56 ~ 63 byte | Command 8 - Data Transfer Count and LBA |

METHOD AND APPARATUS FOR EFFECTIVELY INCREASING A COMMAND QUEUE LENGTH FOR ACCESSING STORAGE

CROSS REFERENCE TO RELATED APPLICATIONS

This disclosure claims the benefits of the priority of U.S. Provisional Application Ser. No. 61/543,929, filed Oct. 6, 2011, and entitled "USE INFORMATION COMMAND TO INCREASE THE Q-DEPTH OF SATA NCQ COMMAND UNLIMITEDLY" and U.S. Provisional Application Ser. No. 61/618,238, filed Mar. 30, 2012, and entitled "I/O AGGREGATION FOR THE SCSI OF AN SSD DEVICE", which are hereby incorporated by reference in their entirety.

BACKGROUND

The present disclosure describes systems and techniques relating to effectively increasing a command queue length for accessing storage, such as by increasing the Queuing Depth (Q-Depth) of Serial Advanced Technology Attachment (SATA) Native Command Queuing (NCQ) Commands.

Many electronic devices include embedded systems to control the operation of the underlying devices and to provide enhanced functionality and operational flexibility. Typically, non-volatile memory is included as a portion of the embedded system to store operating system program code, issued commands and critical data for operating the embedded system. Some embedded systems use solid state memory as non-volatile memory (e.g., electrically Erasable Read Only Memory (EEPROM)). Solid state memory may be used to accelerate applications to increase data access time, and may be advantageously programmed or re-programmed to provide non-volatile storage of information.

In a computer system, a host bus adapter can connect a host system (e.g., a computer) to other network and storage devices (e.g., a hard disk drive, a solid state drive, an optical disk drive, etc.). Serial Advanced Technology Attachment (SATA) is an interface protocol used to control transfer of data and information from a host to a storage device. Native command queuing is an extension of the SATA protocol allowing a storage device to internally optimize the order in which received read and write commands are executed. Native command queuing protocols typically have a maximum queue length. Command consolidation is possible for sequential commands where the Logical Block Address values are adjacent. That is, sequential commands with adjacent LBAs can be combined into a single command by using the LBA value of the first command and setting a data transfer count to be the sum of the transfer count for the sequential commands.

SUMMARY

The present disclosure includes systems and techniques relating to effectively increasing a command queue length for accessing storage, such as by increasing the Queuing Depth (Q-Depth) of Native Command Queuing (NCQ) Commands.

In an implementation, a controller is configured to communicate with a host through interface hardware using a protocol that has a maximum queue length for outstanding commands. The controller is configured to receive and process commands for accessing storage, including receiving a first command, identifying the first command as an information command having consolidation information, storing the consolidation information, receiving a second command, identifying the second command as a consolidated command associated with the consolidation information, generating multiple commands from the consolidated command using the consolidation information, and processing the multiple commands, each of which includes an address and a data transfer count, with respect to the storage.

These and other implementations can optionally include one or more of the following features. The controller can receive additional commands, identify each of the additional commands as a consolidated command associated with the consolidation information, generate further commands, from each respective consolidated command of the additional commands, using the consolidation information, and process the further commands, each of which includes an address and a data transfer count, with respect to the storage. The controller can identify the first command as an information command having consolidation information by determining that a specific bit is set in a frame information structure corresponding to the first command. The controller can identify the second command as a consolidated command associated with the consolidation information by determining that a specific bit is set in a frame information structure corresponding to the second command. The controller can be a SATA controller utilizing NCQ with a maximum Q-Depth. The maximum Q-depth can be 32 NCQ commands where each of the 32 commands can be referenced by a TAG value ranging from TAG 0 to TAG 31. A proper subset of the 32 NCQ commands can correspond to information commands and a proper subset of the 32 NCQ commands can correspond to consolidated commands. The command referenced by TAG 0 can be an information command specifying consolidation data for consolidated commands referenced by TAGs 1 to TAG 7, the command referenced by TAG 8 can be an information command specifying consolidation data for consolidated commands referenced by TAGs 9 to TAG 15, the command referenced by TAG 16 can be an information command specifying consolidation data for consolidated commands referenced by TAG 17 to TAG 23, and the command referenced by TAG 24 can be an information command specifying consolidation data for consolidated commands referenced by TAGs 25 to TAG 31. The controller can be further enclosed in housing, along with at least a portion of the interface hardware and integrated circuit assemblies forming memory to store data persistently, wherein the integrated circuit assemblies are communicatively coupled with the controller.

In an implementation, a method includes receiving a first command to access a first memory location of a storage device, receiving a second command to access a second memory location of a storage device, constructing a consolidated command including a memory address and a data transfer count associated with each of the first command and the second command, constructing an information command having consolidation information about the consolidated command, and communicating the information command and the consolidated command to the storage device.

These and other implementations can optionally include one or more of the following features. Constructing the consolidated command can include setting a corresponding bit in a frame information structure associated with the consolidated command. Constructing the information command can include setting a corresponding bit in a frame information structure associated with the information command. The storage device can be a SATA device utilizing NCQ with a maximum Q-Depth. The maximum Q-depth can be 32 NCQ commands and wherein each of the 32 commands is referenced by a TAG value ranging from TAG 0 to TAG 31. A proper subset of the 32 NCQ commands can correspond to information commands and a proper subset of the 32 NCQ commands can correspond to consolidated commands.

In an implementation, a system includes a host computer; a storage device including: interface hardware configured to communicate with the host, a controller configured to communicate with the host through the interface hardware using a protocol that has a maximum queue length for outstanding commands, and memory to store data persistently; a host bus adapter communicatively coupled to the host, the host bus adapter including a driver configured to: receive commands to access the memory of the storage device; construct a consolidated command including a memory address and a data transfer count from each of the received commands; construct an information command having consolidation information about the consolidated command; and communicate the information command and the consolidated command to the storage device. The controller included in the storage device is configured to receive and process the information command and the consolidated command communicated by the storage device driver, including performing operations comprising: retrieving the commands from the consolidated command using the consolidation information; and processing the commands based on the memory addresses and the data transfer counts included with the commands.

These and other implementations can optionally include one or more of the following features. Constructing the information command can include setting a bit in a frame information structure associated with the information command such that when the controller included in the storage device receives and processes the information command, the controller can identify the command as an information command. Constructing the consolidated command can include setting a bit in a frame information structure associated with the consolidated command such that when the controller included in the storage device receives and processes the consolidated command, the controller can identify the command as a consolidated command. The storage device can be a SATA device utilizing NCQ with a maximum Q-Depth. The maximum Q-depth can be 32 NCQ commands wherein each of the 32 commands can be referenced by a TAG value ranging from TAG 0 to TAG 31.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques may result in an increase of the Command Queuing Depth (Q-depth) for Native Command Queuing (NCQ) commands beyond a maximum quantity of commands specified by the NCQ protocol. For example, the NCQ protocol for SATA devices currently specifies a maximum Q-depth of 32 commands. By consolidating NCQ commands into consolidated commands and providing consolidation for the consolidated commands in information commands, as described in detail below, NCQ for SATA devices may operate with a Q-depth above the protocols maximum of 32 commands. If the information commands and consolidated commands are based on the standard SATA specification, the systems and techniques described below may be implemented with any suitable SATA Host Bus Adapter (HBA), without a need for specialized HBA hardware. Additionally, the overhead required to process small size data transfer commands (e.g., 5 kbs or less) with random Logical Block Addresses (e.g., non-sequential LBAs) may be reduced by consolidating normal NCQ into consolidated commands and increasing the Q-Depth specified by the SATA NCQ protocol.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Flash Memory Overview

Figure 1:
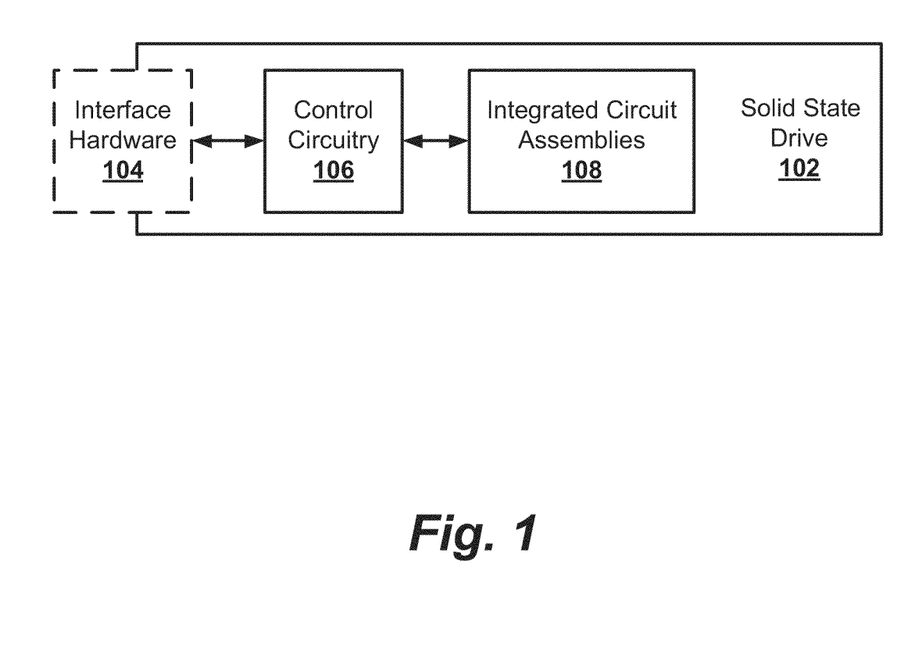
FIG. 1 shows a block diagram of a solid state drive.

FIG. 1 shows a block diagram of a Solid State Drive (SSD) 102. SSD 102 includes integrated circuit assemblies 108 forming memory to store data persistently. In some implementations, integrated circuit assemblies 108 may be "NAND" type flash memory. NAND flash memory generally has faster erase and program times, higher density, lower cost per bit, and more endurance than, for example, NOR-type flash memory. NAND flash memory may utilize series strings of more than two memory cells, such as 16 or 32, connected along with one or more select transistors between individual bit lines and a reference potential to form columns of cells. Word lines may extend across cells within such columns. An individual cell within a column may be read and verified during programming by causing the remaining cells in the string to be turned on so that the current flowing through a string may be dependent upon the level of charge stored in the addressed cell.

SSD 102 includes control circuitry 106 for communicating with integrated circuit assemblies 108. In some implementations, control circuitry 106 includes an embedded processor that executes firmware-level code to bridge the integrated circuit assemblies 108 with a host system (not shown). For example, control circuitry 106 may include a NAND flash I/O (Input/Output) controller for communicating with a NAND memory, and may allow only sequential access to data stored in the NAND flash memory.

SSD 102 includes interface hardware 104 for connecting SSD 102 to a host bus adapter of a host (not shown). In some implementations, interface hardware 104 includes one or more standard connectors. Examples of standard connectors may include, without limitation, SATA, SCSI (Small Computer System Interface), USB (Universal Serial Bus), PCM-CIA (Personal Computer Memory Card International Association), and IEEE-1394 (Firewire). In some implementations, interface hardware 104 may include multiple pins each corresponding to a specific function. For example, pins for power, ground, send, receive, transfer complete, communication, and the like.

While NAND flash memory has been described in the examples for Solid State Drive 102, it should be noted that other memory types also may be used, such as, without limitation, NOR flash EEPROM, AND flash EEPROM, DiNOR flash EEPROM, serial flash EEPROM, DRAM, SRAM, ROM, EPROM, FRAM, MRAM, and PCRAM.

Storage System

Figure 2:
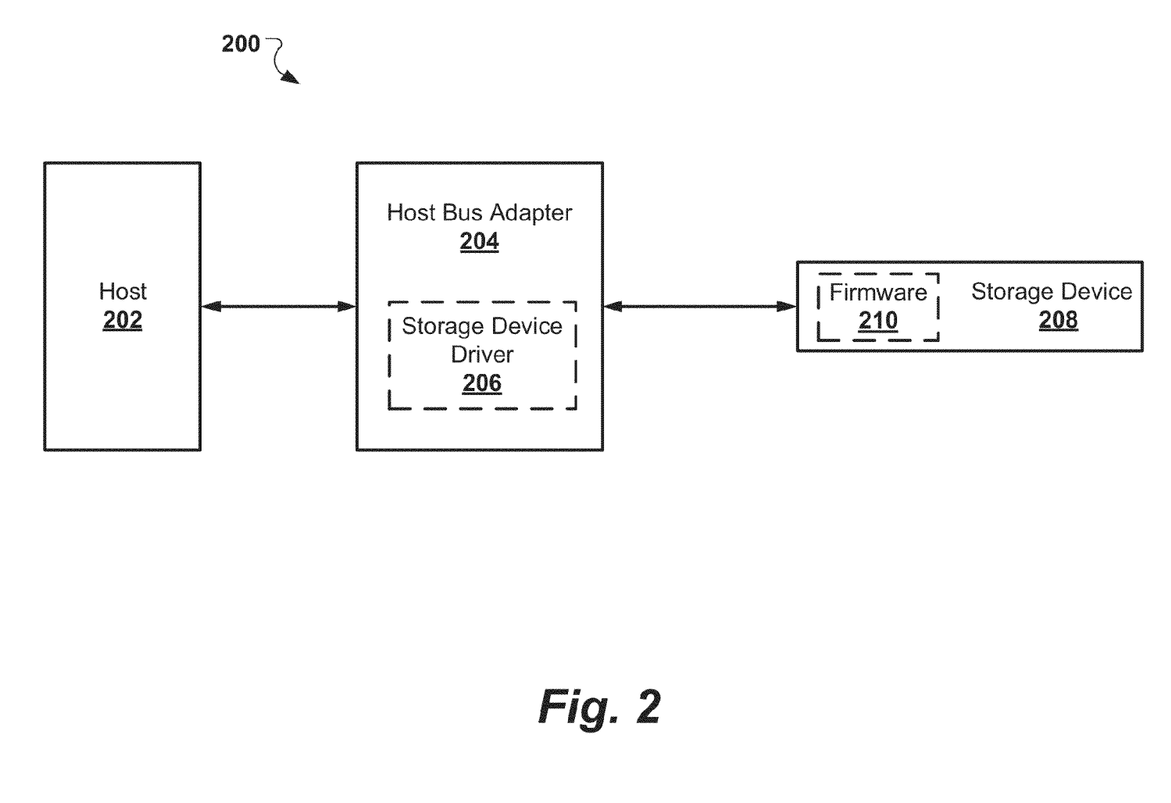
FIG. 2 shows an example of a storage system.

FIG. 2 shows an example of a storage system 200. As shown in FIG. 2, the system 200 includes a host 202 in communication with a storage device 208 using a host bus adapter 204. Various examples of host bus adapter 204 include physical interfaces such as Serial Advanced Technology Attachment (SATA), Small Computer System Interface (SCSI), USB (Universal Serial Bus), PCMCIA (Personal Computer Memory Card International Association), IEEE-1394 (Firewire), Peripheral Component (PCI), PCI Express (PCIe), Serial Attached SCSI (SAS), and interfaces for memory cards such as MultiMediaCards (MMCs).

Various examples for storage device 208 include a solid state drive (e.g., solid state drive 102 in FIG. 1), a hard disk drive (HDD), an optical disk drive, and the like. In some implementations, storage device 208 includes firmware 210. Firmware 210 can be code executing on a controller included in storage device 208 operable to bridge the memory components of storage device 208 with an interface of host bus adapter 204.

In some implementations, host bus adapter 204 includes storage device driver 206 for receiving and processing one or more service requests or commands (e.g., read and write requests) directed to storage device 208. For example, storage device driver 206 may be configured to manage and control storage and retrieval of data stored in memory of storage device 208 in response to commands from host 202. That is, storage device driver 206 may control the flow of commands and data between host 202 and storage device 208.

In some implementations, storage device driver 206 is a part of a microcomputer system under the control of a microprocessor (not shown). For example, storage device driver 206 can include read-only memory (ROM), random-access memory (RAM) and other internal circuits.

Native Command Queuing (NCQ) is a command protocol that allows multiple commands corresponding to a storage device to be outstanding at the same time. Storage devices compatible with NCQ can internally optimize the order in which received read and write commands are executed. For example, storage device drivers and storage devices that support NCQ can maintain a queue where outstanding commands can be dynamically rescheduled or re-ordered, along with the necessary tracking mechanisms for outstanding and completed commands. In some implementations, NCQ also has a mechanism that allows a host to issue additional commands to the storage device while the storage device is seeking for data for another command. In some implementations, intelligent reordering of commands within a storage device's command queue can help improve performance of queued workloads. For example, in the case of a hard disk drive (HDD), intelligent reordering can reduce the amount of unnecessary drive head movement, resulting in increased performance and decreased wear of the drive for workloads where multiple simultaneous read/write requests are outstanding.

In some implementations, when using NCQ for small size data transfers (e.g., 4 KB per command or less) a large percentage of the total time to process the commands is consumed by the command process overhead, thus reducing the overall performance of NCQ. For sequential read or write commands where Logic Block Addressing (LBA) values are adjacent, it may be possible to combine multiple read or write commands together into one read or write command by using the LBA value of the first command and setting the data transfer count to be the sum of the multiple commands. This technique is a form of command consolidation. However, for random commands with non-adjacent LBA values, such command consolidation may be less effective. For example, random commands usually have random LBA values, which may make it more difficult if not impossible to combine multiple random read or write commands together into one read or write command simply by using the LBA value of the first command and setting the data transfer count to be the sum of the multiple commands, as done with sequential command consolidation.

To improve the performance of small size data transfer with random LBAs, command consolidation and increases in a NCQ command queuing depth can be done in a more generic and intelligent manner. For example, to send more than a maximum number of specified commands for a NCQ protocol, multiple NCQ commands can be consolidated into a single NCQ command.

Within the SATA protocol, the command queuing depth (Q-depth) for NCQ is thirty-two (32) commands. That is, a total of 32 NCQ commands can be pending execution by a SATA connected storage device at any given time. In some implementations, each NCQ command is associated with a TAG, where the value of the TAG is an integer between 0 and 31. A TAG is a shorthand mechanism to identify a particular outstanding NCQ command. Each outstanding NCQ command has a unique tag value. To send more than 32 SATA NCQ commands, multiple NCQ commands can be included within a NCQ command and referenced by a single TAG.

In some implementations, a NCQ command includes a Frame Information Structure (FIS) which specifies the contents of the command. For example, a SATA NCQ read or write command may have a FIS comprising 20 bytes. In some implementations, the most important portions of the SATA NCQ command include a data transfer count and logical block address (LBA) numbers corresponding to a memory location. In some implementations, the data transfer count and the LBA numbers included in a SATA NCQ command FIS correspond to 8 bytes of data in the command. For example, 6 bytes for LBA data and 2 bytes for transfer count data.

In some implementations, a driver (e.g., storage device driver 206) consolidates NCQ commands and communicates this information to a storage device (e.g., storage device 208). For example, a storage device driver can consolidate multiple NCQ commands into a consolidated NCQ command referenced by a single TAG. In some implementations, the storage device driver sets a bit in the consolidated command's FIS to identify the consolidated command as a consolidated command. For example, the storage device driver can set a bit in a control register of the consolidated command's FIS to identify a command as a consolidated command.

Further, the storage device driver can construct an information command referenced by a single TAG that includes consolidation data for multiple consolidated commands. In some implementations, the storage device driver sets a bit in the information command's FIS to identify the information command as an information command. For example, the storage device driver can set a bit in a control register of the information command's FIS to identify the command as an information command. In some implementations, other criteria may be required to identify a command as in information command or a consolidated command. For example, an information command can also be specified as having all LBA registers in the information command's FIS set to a value of zero.

Below is a command table showing examples for specifying a normal command, an information command, and a consolidated command type:

| Command type | Operation code | Description |
|---|---|---|
| Normal command | 60h, 61h, 63h, 64h, 65h | Defined in SATA specification No special bit defined in command FIS |
| Information command | 61h or 65h | NCQ write commands, data length could be but not limited to 512B Special bit defined in command FIS (e.g., by a storage driver) |
| Consolidated command | 60h, 61h, 64h, 65h | Same as normal NCQ read write command. (not include 63h) Special bit defined in command FIS (e.g., by a storage driver) |

Figure 3:
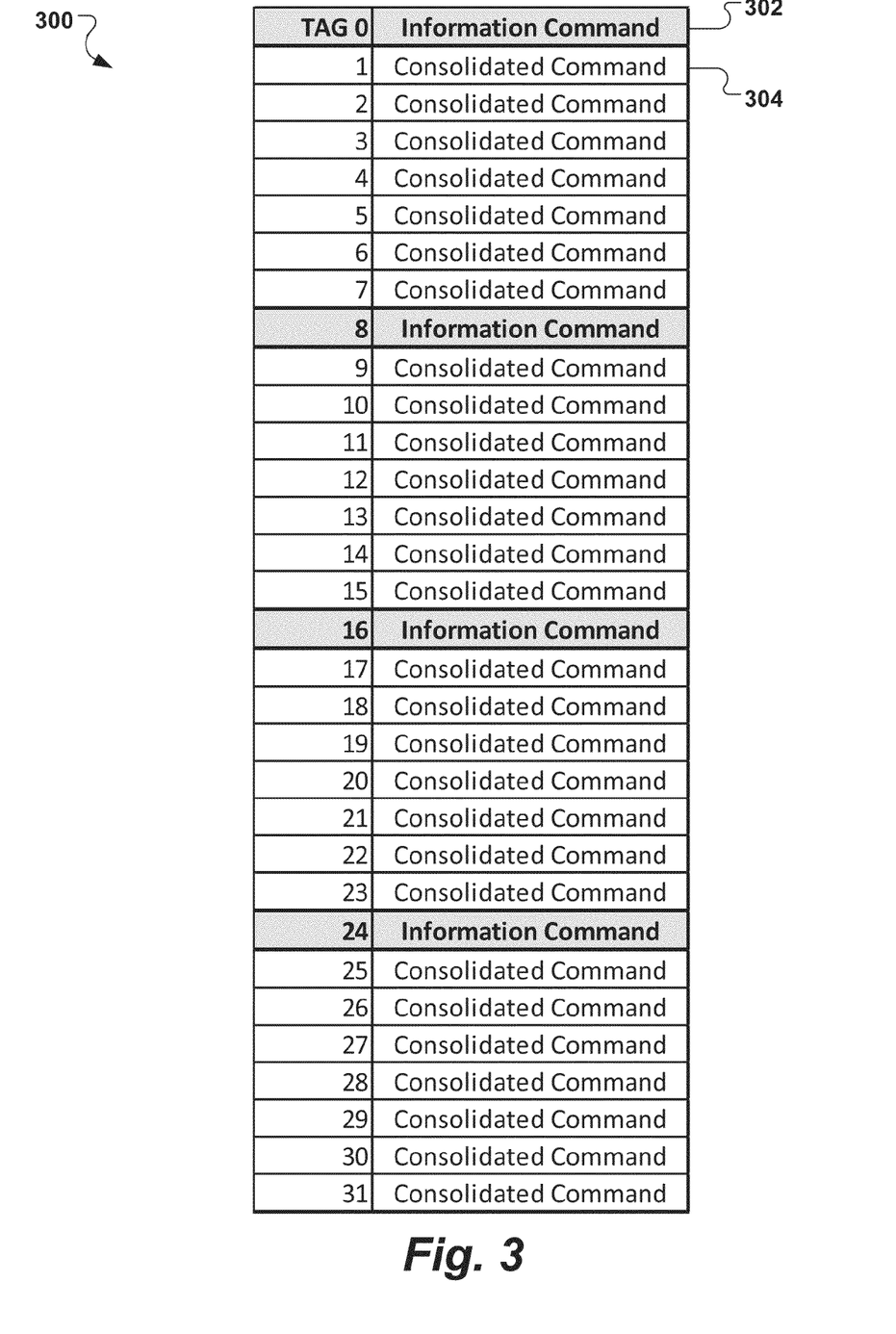
FIG. 3 shows an example of structure for NCQ commands.

FIG. 3 shows an example 300 of a SATA NCQ command structure. In FIG. 3, the maximum Q-Depth for the SATA NCQ command structure 300 is shown as 32 commands. In some implementations, a storage device driver (e.g., storage device driver 206) uses TAG 0 (identified by 302) as well as TAGs 8, 16 and 24 to reference information commands and TAG 1 (identified by 304) as well as TAGs 2-7, 9-15, 17-23, and 25-31 to send consolidated commands. Information commands and consolidated commands need not be restricted to those TAGs shown in FIG. 3. Rather, it should be appreciated that any TAG in the command structure 300 may correspond to either an information command or a consolidated command.

In some implementations, the information command at TAG 0 specifies the consolidation data for consolidated commands associated with TAG 1 to TAG 7. Similar schemes are applicable for the information commands corresponding to TAGS 8, 16, and 24. For example, the TAG 8 information command can specify the consolidation data for consolidated commands associated with TAG 9 to TAG 15; the TAG 16 information command can specify the consolidation data for consolidated commands associated with TAG 17 to TAG 23; and the TAG 24 information command can specify the consolidation data for consolidated commands associated with TAG 25 to TAG 31.

Figure 4A:
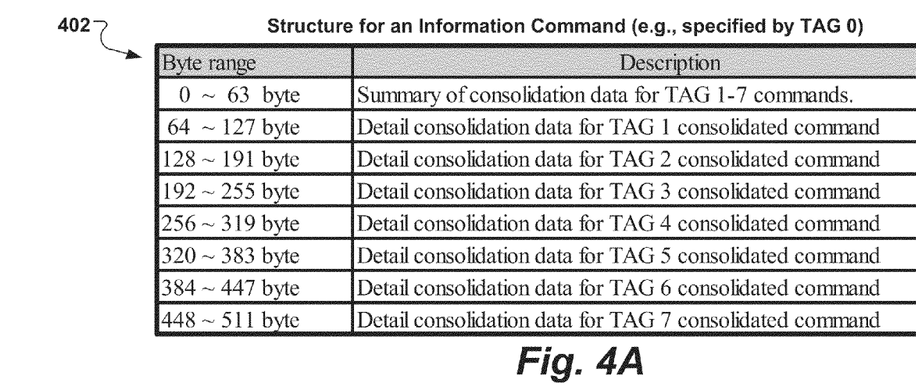
FIG. 4A shows an example of structure for an information command.

FIG. 4A shows an example structure 402 for an information command. In some implementations, the structure 402 can correspond to an information command specified by TAG 0 (e.g., 302 shown in FIG. 3) and having 512 bytes of data. An information command is not limited to 512 bytes of data, but can be any suitable size necessary for increasing the NCQ Q-Depth to a desired number of commands in a given system.

Figure 4B:
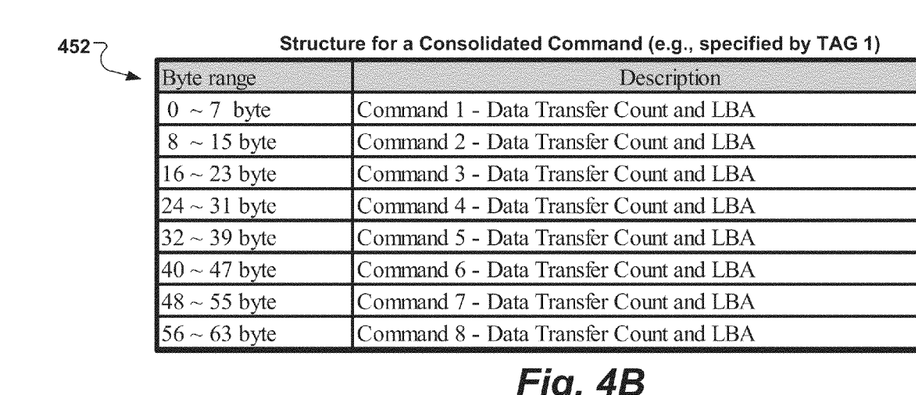
FIG. 4B shows an example of structure for a consolidated command.

FIG. 4B shows an example information structure 452 for a consolidated command. In some implementations, the structure 452 corresponds to a consolidated command specified by TAG1 (e.g., 304 shown in FIG. 3) and having 64 bytes of data. A consolidated command is not limited to 64 bytes, but can be any suitable size necessary for increasing the Q-Depth to a desired number of commands in a given system. In some implementations, a transfer count and LBA for a NCQ command total 8 bytes and are used as the data for the NCQ command. In this manner, information structure 452 can identify 8 NCQ commands corresponding to a single NCQ TAG. That is, a single NCQ command can include 8 NCQ commands under the guise of a single NCQ TAG.

In some implementations, with the example structures shown in FIGS. 4A and 4B and a NCQ Q-Depth of 32, a proper subset of the 32 NCQ commands can correspond to information commands and a proper subset of the 32 NCQ commands can correspond to consolidated commands. For example, four of the 32 commands can be identified by TAGs (e.g., TAG 0, TAG 8, TAG 16, and TAG 24) and correspond to information commands and the remaining 28 commands can be identified by the 28 remaining TAGs and correspond to consolidated commands. In some implementations, each consolidated command represents 8 NCQ normal commands. In the example where a proper subset of 4 of the 32 NCQ commands correspond to information commands and a proper subset of 28 of the 32 NCQ commands correspond to consolidated commands with each consolidated command representing 8 NCQ normal commands, the resulting NCQ Q-Depth can be a total of 224 NCQ commands.

In some implementations, if more NCQ commands need to be consolidated under a single NCQ TAG, the data length of the information command can be increased along with an increase in the consolidation data for the consolidated commands. In general, any suitable number of consolidated commands can be specified in an information command and any suitable number of NCQ commands can be consolidated into one consolidated command.

Figure 5:
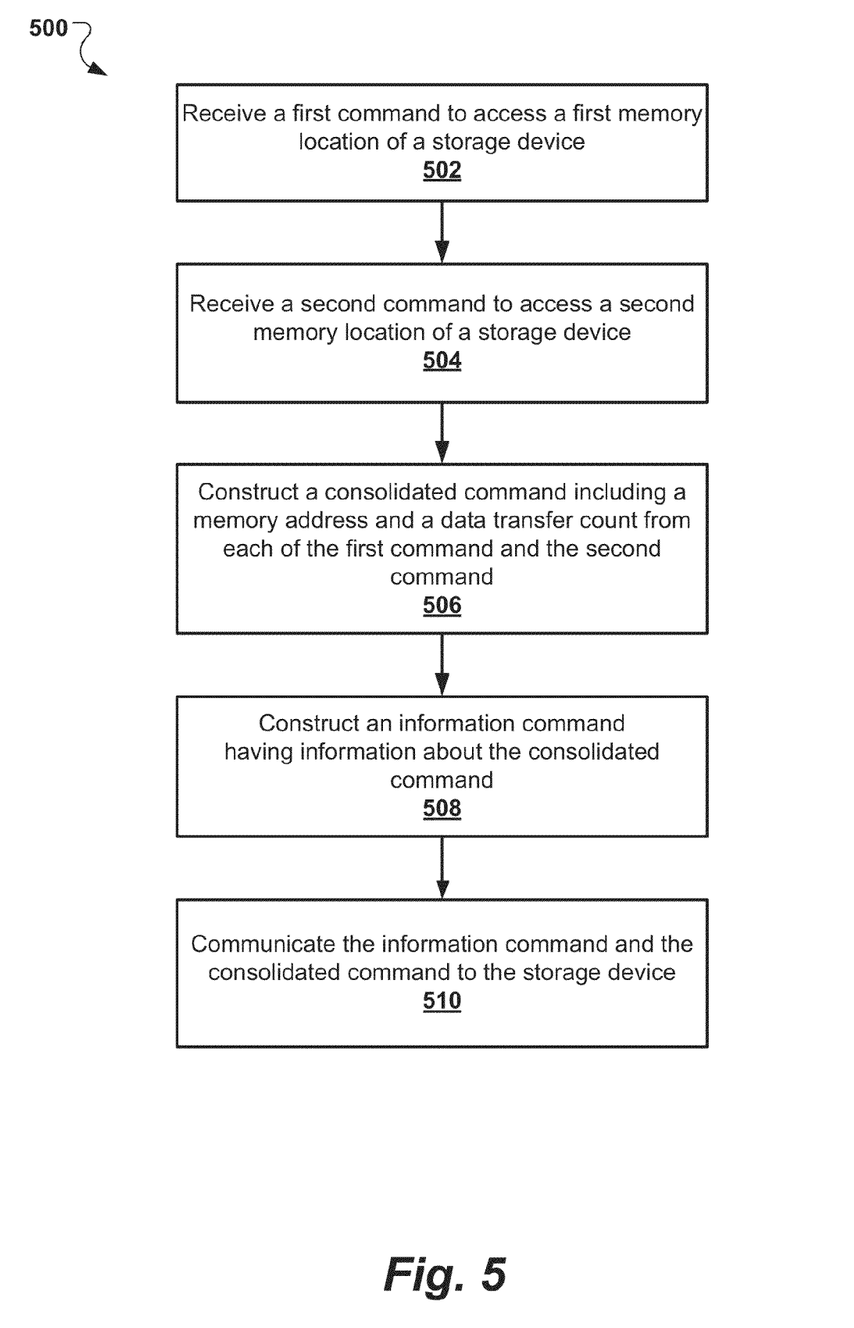
FIG. 5 shows an example of a process for consolidating NCQ commands.

FIG. 5 shows an example of a process 500 for consolidating NCQ commands. In some implementations, a storage device driver executes the process 500 for consolidating NCQ commands as described in FIG. 5 (e.g., storage device driver 206). At 502, the process receives a first command to access a first memory location of a storage device. In some implementations, the first command may be a read or write request originating from a host system (e.g., host 202) for access to memory of a storage device (e.g., storage device 208). At 504, the process receives a second command to access a second memory location of the storage device. In some implementations, the second command may be a read or write request originating from a host system (e.g., host 202) for access to memory of a storage device (e.g., storage device 208). In some implementations, the first and second commands request access to non-sequential, or random, logical block addresses of a storage device. For example, the first command and second command need not be consecutive commands or received consecutively (e.g., from host 202).

At 506, the process constructs a consolidated command including a memory address and a data transfer count from each of the first command and the second command. In some implementations, the consolidated command can be a normal read or write SATA NCQ command with a specified bit set in a frame information structure for the command that identifies the command as a consolidated command. For example, storage device driver 206 can construct a consolidated command corresponding to a SATA NCQ TAG that includes a data transfer count and a logical block address associated with the first command received at 502 and a data transfer count and a logical block address associated with the second command received at 504.

At 508, the process constructs an information command having information about the consolidated command. In some implementations, the information command can be a normal read or write SATA NCQ command with a specified bit set in a frame information structure for the command that identifies the command as an information command. For example, storage device driver 206 can construct an information command corresponding to a SATA NCQ TAG that includes consolidation data for a consolidated command (e.g., a consolidated NCQ command corresponding to a different TAG).

At 510, the process communicates the information command and the consolidated command to the storage device. In some implementations, storage device driver 206 communicates the information command and the consolidated command to firmware executing on control circuitry of storage device 208. In some implementations, the order in which the information command and the consolidated command are communicated to the storage device is irrelevant.

Figure 6:
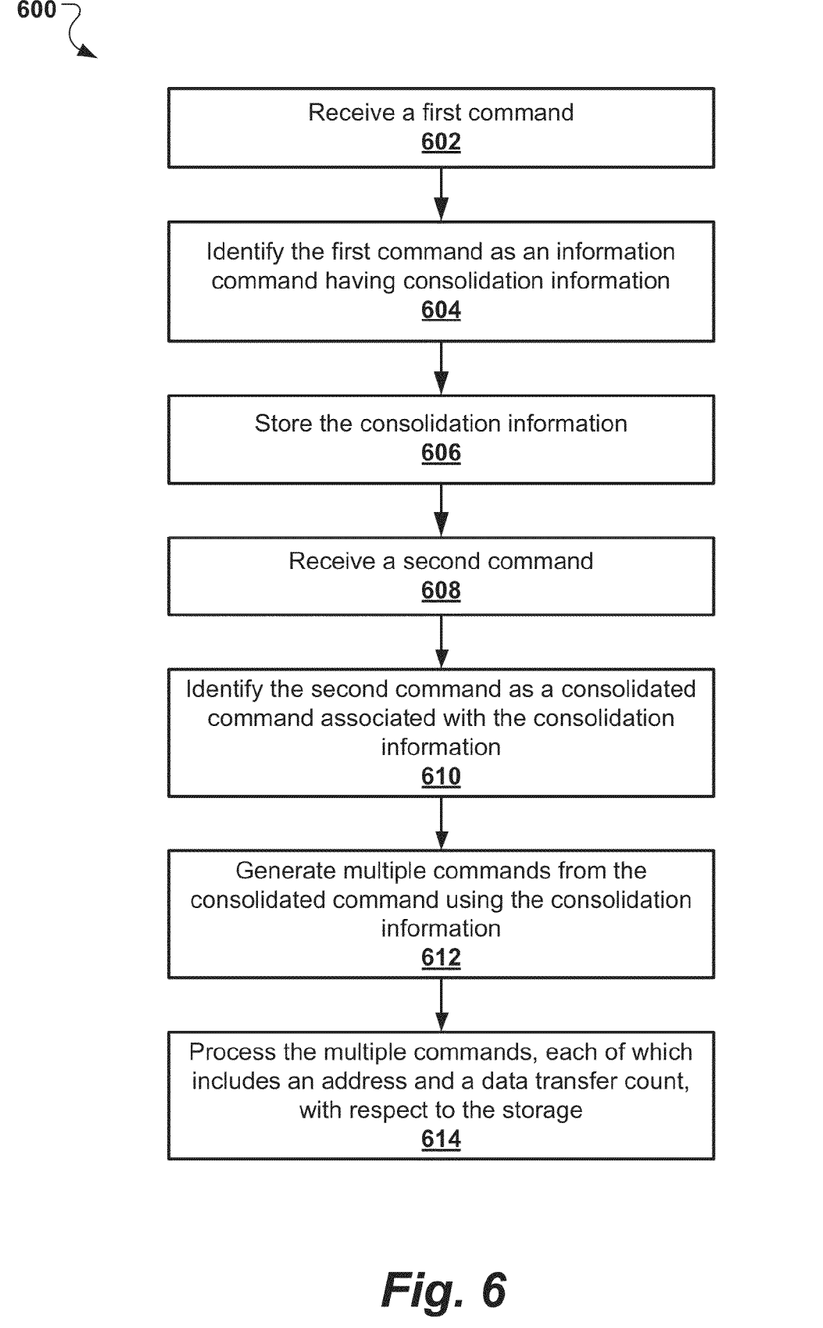
FIG. 6 shows an example of a process for processing consolidated and information NCQ commands.

FIG. 6 shows an example of a process 600 for processing consolidated and information NCQ commands. In some implementations, firmware installed on a storage device (e.g., firmware executed by control circuitry 106 of solid state drive 102) may be configured to execute a process for processing consolidated and information NCQ commands as described in FIG. 6. At 602, the process receives a first command. In some implementations, the first command is a SATA NCQ command and that is received by firmware of a storage device (e.g., firmware executing on control circuitry 106 of solid state drive 102).

At 604, the process identifies the first command as an information command having consolidation information. In some implementations, the first command is a SATA NCQ information command and the process identifies the first command as an information command by determining whether a specified bit is set in a frame information structure for the command.

At 606, the process stores the consolidation information. For example, the consolidation information can be stored in memory of control circuitry 106 such that it is available to control circuitry 106 for further processing.

At 608, the process receives a second command. In some implementations, the second command is a SATA NCQ command and is received by firmware of a storage device (e.g., firmware executing on control circuitry 106 of solid state drive 102).

At 610, the process identifies the second command as a consolidated command associated with the consolidation information. In some implementations, the second command is a SATA NCQ consolidated command and the process identifies the second command as a consolidated command by determining whether a specified bit is set in a frame information structure for the command.

At 612, the process generates multiple commands from the consolidated command using the consolidation information. For example, using the consolidation information, when a device receives and processes a consolidated command, the device can identify multiple commands associated with the consolidated command. The device can further identify a number of different LBA segments and related transfer-counts that are associated with the multiple commands.

At 614, the process processes the multiple commands, each of which includes an address and a data transfer count, with respect to the storage. In some implementations, the addresses correspond to memory locations of integrated circuit assemblies 108 and the commands are processed by control circuitry 106 to access the specified memory locations.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Other embodiments fall within the scope of the following claims.

What is claimed is:

1. A device comprising:
a controller configured to communicate with a host through interface hardware using a protocol that has a maximum queue length for outstanding commands;
wherein the controller is further configured to receive and process commands for accessing storage, including performing operations comprising:
receiving a first command;
identifying the first command as an information command having consolidation information;
storing the consolidation information;
receiving a second command;
identifying the second command as a consolidated command associated with the consolidation information;
generating multiple commands from the consolidated command using the consolidation information; and
processing the multiple commands, each of which includes an address and a data transfer count, with respect to the storage.

2. The controller of claim 1, wherein the operations further comprise:

receiving additional commands;
identifying each of the additional commands as a consolidated command associated with the consolidation information;
generating further commands, from each respective consolidated command of the additional commands, using the consolidation information; and
processing the further commands, each of which includes an address and a data transfer count, with respect to the storage.

3. The controller of claim 1, wherein identifying the first command as an information command having consolidation information includes determining that a specific bit is set in a frame information structure corresponding to the first command.

4. The controller of claim 1, wherein identifying the second command as a consolidated command associated with the consolidation information includes determining that a specific bit is set in a frame information structure corresponding to the second command.

5. The controller of claim 1, wherein the controller is a Serial Advanced Technology Attachment (SATA) controller utilizing Native Command Queuing (NCQ) with a maximum Queuing Depth (Q-Depth).

6. The controller of claim 5, wherein the maximum Q-depth is 32 NCQ commands and wherein each of the 32 commands is referenced by a TAG value ranging from TAG 0 to TAG 31.

7. The controller of claim 6, wherein a proper subset of the 32 NCQ commands correspond to information commands and a proper subset of the 32 NCQ commands correspond to consolidated commands.

8. The controller of claim 7, wherein the command referenced by TAG 0 is an information command specifying consolidation data for consolidated commands referenced by TAGs 1 to TAG 7, the command referenced by TAG 8 is an information command specifying consolidation data for consolidated commands referenced by TAGs 9 to TAG 15, the command referenced by TAG 16 is an information command specifying consolidation data for consolidated commands referenced by TAG 17 to TAG 23, and the command referenced by TAG 24 is an information command specifying consolidation data for consolidated commands referenced by TAGs 25 to TAG 31.

9. The controller of claim 1, further comprising:
a housing enclosing:
the controller;
at least a portion of the interface hardware; and
integrated circuit assemblies forming memory to store data persistently, wherein the integrated circuit assemblies are communicatively coupled with the controller.

10. A method comprising:
receiving a first command to access a first memory location of a storage device;
receiving a second command to access a second memory location of a storage device;
constructing a consolidated command including a memory address and a data transfer count associated with each of the first command and the second command;
constructing an information command having consolidation information about the consolidated command; and
communicating the information command and the consolidated command to the storage device.

11. The method of claim 10, wherein constructing the consolidated command includes setting a corresponding bit in a frame information structure associated with the consolidated command.

12. The method of claim 10, wherein constructing the information command includes setting a corresponding bit in a frame information structure associated with the information command.

13. The method of claim 10, wherein the storage device is a SATA device utilizing NCQ with a maximum Q-Depth.

14. The method of claim 13, wherein the maximum Q-depth is 32 NCQ commands and wherein each of the 32 commands is referenced by a TAG value ranging from TAG 0 to TAG 31.

15. The method of claim 14, wherein a proper subset of the 32 NCQ commands correspond to information commands and a proper subset of the 32 NCQ commands correspond to consolidated commands.

16. The method of claim 15, wherein the command referenced by TAG 0 is an information command specifying consolidation data for consolidated commands referenced by TAGs 1 to TAG 7, the command referenced by TAG 8 is an information command specifying consolidation data for consolidated commands referenced by TAGs 9 to TAG 15, the command referenced by TAG 16 is an information command specifying consolidation data for consolidated commands referenced by TAG 17 to TAG 23, and the command referenced by TAG 24 is an information command specifying consolidation data for consolidated commands referenced by TAGs 25 to TAG 31.

17. A system comprising:
a host computer;
a storage device including:
interface hardware configured to communicate with the host;
a controller configured to communicate with the host through the interface hardware using a protocol that has a maximum queue length for outstanding commands; and
memory to store data persistently;
a host bus adapter communicatively coupled to the host, the host bus adapter including a driver configured to:
receive commands to access the memory of the storage device;
construct a consolidated command including a memory address and a data transfer count from each of the received commands;
construct an information command having consolidation information about the consolidated command; and
communicate the information command and the consolidated command to the storage device; and
wherein the controller included in the storage device is configured to receive and process the information command and the consolidated command communicated by the storage device driver, including performing operations comprising:
retrieving the commands from the consolidated command using the consolidation information; and
processing the commands based on the memory addresses and the data transfer counts included with the commands.

18. The system of claim 17, wherein constructing the information command includes setting a bit in a frame information structure associated with the information command such that when the controller included in the storage device receives and processes the information command, the controller can identify the command as an information command.

19. The system of claim 17, wherein constructing the consolidated command includes setting a bit in a frame information structure associated with the consolidated command such that when the controller included in the storage device receives and processes the consolidated command, the controller can identify the command as a consolidated command.

20. The system of claim 17, wherein the storage device is a SATA device utilizing NCQ with a maximum Q-Depth.

21. The system of claim 20, wherein the maximum Q-depth is 32 NCQ commands and wherein each of the 32 commands is referenced by a TAG value ranging from TAG 0 to TAG 31.

22. The system of claim 21, wherein a proper subset of the 32 NCQ commands correspond to information commands and a proper subset of the 32 NCQ commands correspond to consolidated commands.

23. The system of claim 22, wherein the command referenced by TAG 0 is an information command specifying consolidation data for consolidated commands referenced by TAGs 1 to TAG 7, the command referenced by TAG 8 is an information command specifying consolidation data for consolidated commands referenced by TAGs 9 to TAG 15, the command referenced by TAG 16 is an information command specifying consolidation data for consolidated commands referenced by TAG 17 to TAG 23, and the command referenced by TAG 24 is an information command specifying consolidation data for consolidated commands referenced by TAGs 25 to TAG 31.

* * * * *